United States Patent [19]
Kuroyama et al.

[11] Patent Number: 5,183,362
[45] Date of Patent: Feb. 2, 1993

[54] CUTTING TOOL ASSEMBLY

[75] Inventors: Yutaka Kuroyama; Masami Maeno; Ikuo Sakakibara, all of Aichi, Japan

[73] Assignee: Nippon Oil and Fats Co., Ltd., Tokyo, Japan

[21] Appl. No.: 861,336

[22] Filed: Mar. 30, 1992

Related U.S. Application Data

[63] Continuation of Ser. No. 639,244, Jan. 8, 1991, abandoned.

[30] Foreign Application Priority Data

Jan. 10, 1990 [JP] Japan .................. 2-1369[U]
Feb. 21, 1990 [JP] Japan .................. 2-17216[U]
Apr. 13, 1990 [JP] Japan .................. 2-40184[U]

[51] Int. Cl.$^5$ ............................................. B23P 15/28
[52] U.S. Cl. .................... 407/118; 407/119; 407/116
[58] Field of Search .............. 407/116, 117, 118, 119, 407/120, 66, 100, 102, 113, 114

[56] References Cited

U.S. PATENT DOCUMENTS

| | | | |
|---|---|---|---|
| 383,192 | 5/1888 | Seaman | 407/119 X |
| 1,904,049 | 4/1933 | Hoyt | 407/118 X |
| 2,101,376 | 12/1937 | Voightländer | 407/119 X |
| 3,369,283 | 2/1968 | Colding | 407/119 |
| 3,487,514 | 1/1970 | Akashi | 75/244 |
| 3,702,573 | 11/1972 | Nemeth | 407/119 X |
| 4,373,593 | 2/1983 | Phaal et al. | 407/119 X |
| 4,498,549 | 2/1985 | Jürgens | 407/119 X |
| 4,566,905 | 1/1986 | O'Brien | 29/95 |
| 4,854,784 | 8/1989 | Murray et al. | 407/116 X |

FOREIGN PATENT DOCUMENTS

| | | | |
|---|---|---|---|
| 607280 | 10/1960 | Canada | 407/118 |
| 3844007 | 7/1989 | Fed. Rep. of Germany | 407/120 |
| 54-292 | 1/1979 | Japan . | |
| 54-73389 | 6/1979 | Japan . | |
| 54-73391 | 6/1979 | Japan . | |
| 63-24002 | 2/1988 | Japan . | |
| 63-10882 | 3/1988 | Japan . | |

Primary Examiner—Larry I. Schwartz
Assistant Examiner—J. R. Daulton
Attorney, Agent, or Firm—Heller, Ehrman, White & McAuliffe

[57] ABSTRACT

Disclosed is a cutting tool assembly employing a composite hard sintered body as a cutting part comprising a support and a cutting edge; wherein the cutting part is secured on a base made of a cemented carbide or a hard alloy having at least one edge where a recess is formed, the cutting part being formed by bonding a hard sintered body constituting the cutting edge and a cemented carbide or a cermet consituting the support, and said cutting part being secured in the recess by soldering in such a way that the support side may face the recess.

7 Claims, 10 Drawing Sheets

CUTTING TOOL ASSEMBLY

This is a continuation of application Ser. No. 07/639,244 filed Jan. 8, 1991, now abandoned.

BACKGROUND OF THE INVENTION

1. Field of the Invention

This invention relates to a cutting tool assembly having a composite sintered body as its cutter.

2. Description of the Related Art

Hard sintered bodies primarily comprising high pressure phase boron nitride or diamond are widely used as the cutting elements of cutting tools because of their high hardness and high thermal conductivity. These cutter elements are typically soldered on a base made of cemented carbides or hard alloys such as cermet. However, since such cutter elements have poor wettability against solders, they are usually combined with a bonding layer into a form of composite cutter body that can be soldered onto the base through the bond layer.

Soldering is typically used because if high pressure phase boron nitride or diamond cutting materials are subjected to high temperatures (such as during welding), the former is adversely converted into a low pressure phase hexagonal type boron nitride and the later into a low pressure phase graphite with reduced hardness. Therefore, they lose their usefulness as cutting instruments On the other hand, soldering does not have a very high bond strength. Since the price of such a cutting tool assembly is proportional to that of the cutting part, it is economical to minimize the size of the cutting part. However, since the solder has a relatively low bond strength, the cutting tool assembly is not usable unless the composite cutter has at least a predetermined area.

Figure 22:
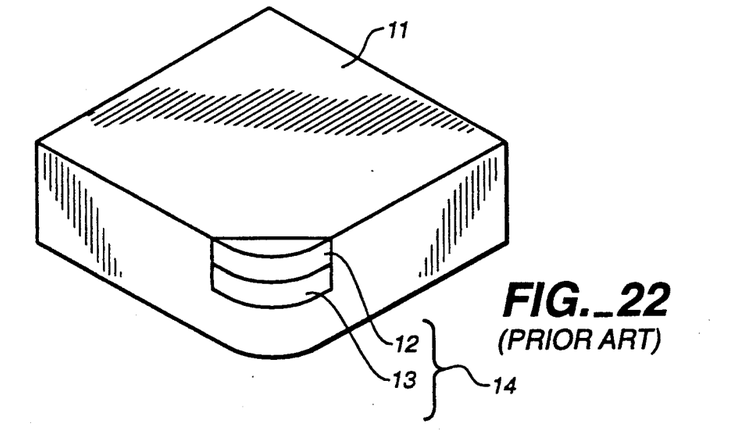
FIG. 22, is a perspective view of a composite cutting tool assembly.
Figure 28:
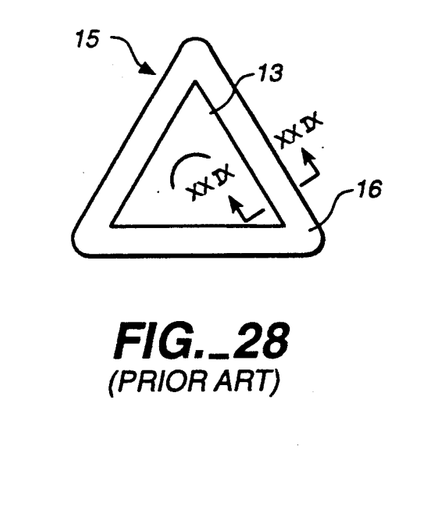
FIG. 28 is a plan view of a cutting tool assembly having a breaker.

A typical prior art cutting tool assembly is shown in FIGS. 22 and 28 The cutting assembly includes a base 11 and a composite cutting part 14. The base is made of a cemented carbide or a hard alloy and has a notch at one corner thereof. The cutting part 14 includes a hard sintered body 12 and a support of cemeted carbide 18. The cutting part 14 is secured in the notch. This assembly is of a so-called throw away tip which is never reused by sharpening. Rather it is thrown away when the edge thereof is worn.

Figure 23:
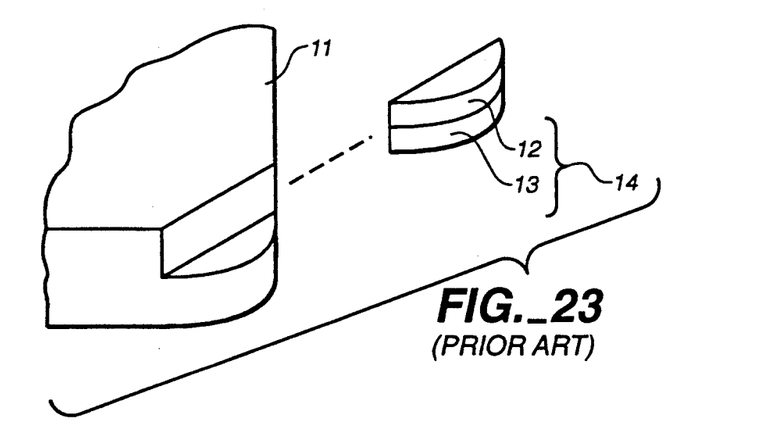
FIG. 23, is a exploded perspective view showing how the cutting part is secured to the base.

In the cutting tool shown in FIGS. 22 and 23, however, the stress parallel to the bond faces of the base 11 and the cutting part 14 (hereinafter referred to as feed force) during cutting lowers the bond strength that secures the cutting part 14 onto the base 11. Therefor, the cutting part 14 is liable to come off the base 11 or to be chipped.

Japanese Unexamined Patent Publication No. 292/1979 discloses a cutting tool assembly, wherein a hard polycrystalline substance is used as the cutting part. The thickness of the cutting face of the cutting part (between its top and bottom surfaces) is greater than the width (between the side surfaces) where it is secured to the base. In this cutting tool assembly, however, the cutting part is secured to the base merely by soldering a very limited bonding area. Therefore, it suffers the disadvantage of low resistance against the feed force.

The cutting tool assembly disclosed in Japanese Unexamined Patent Publication No. 78391/1979 has a cutting part comprising a strip-like hard sintered body in which one pair of opposing sides are longer than the remaining pair. The sintered body is embedded on the cutting face such that one of the shorter sides serves as the cutting edge. In this cutting tool assembly, however, when the strip-like sintered body is soldered onto the base, it often cracks due to the influence of thermal stress. Moreover, repeated heat treatment for repositioning the sintered body to provide new cutting edges causes transition of the high pressure phase boron nitride or diamond into a low pressure stable state with low hardness.

Figure 24:
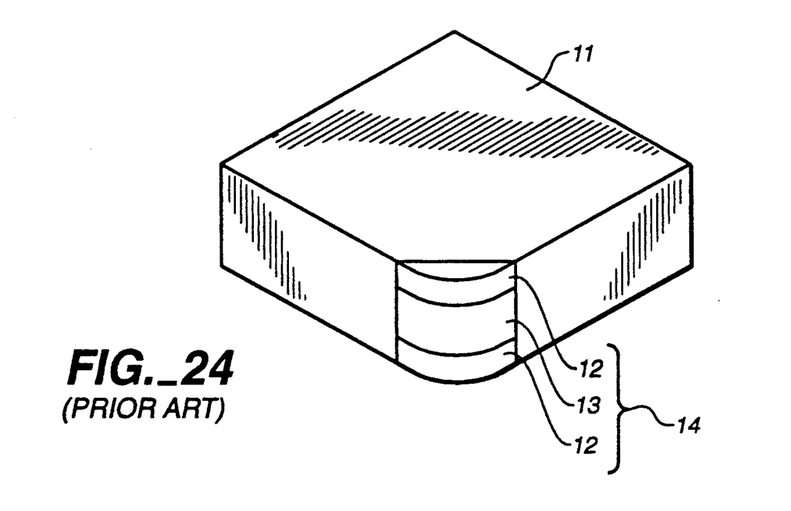
FIG. 24 is a perspective view showing a composite cutting tool assembly.

Japanese Utility Model Publication No. 10882/1988 also discloses a composite disposable tip assembly cutting tool. As shown in FIG. 24, the cutting part 14 comprises upper and lower sintered body layers 12 and an intermediate layer of cemented carbide support 18. The cutting part is secured at one corner of the base 11 over the entire thickness thereof. However, the cutting part 14 is merely secured at the support of cemented carbide 18 by soldering. Therefore, the retention of the hard sintered body 12 against the feed force and the stress applied perpendicularly to the cutting face (hereinafter referred to as cutting force) will be insufficient.

Additionally, when processing of metal or the like is subjected to cutting, insufficient discharge of chips will damage the cutting tool or cause the surface of the work to be poorly finished. Additionally, in an automatic machining center, productivity is dependent upon the efficient disposal of chips.

In order to discharge chips effectively, it can be contemplated to vary cutting conditions or to provide a chip breaker adjacent to the cutting part of the cutting tool for breaking the chips into adequate length of pieces. The chip breaker comprises a groove or a protrusion where chips are broken into finer pieces. In the former method, the acceptable range in which the cutting conditions can be varied will be quite limited under circumstances where high accuracy and high efficiency in cutting are desired. Therefore, the latter method is generally preferred because it allows the formation of various shapes of grooves and protrusions and has wide applications.

When a cutting tool is provided with a chip breaker, the chip breaker should have high fracture toughness, excellent abrasion resistance and an ability of allowing relatively easy cutting in order to exhibit its function effectively. Thus, a few embodiments of chip breakers for throw away tips made of cemented carbide are shown in FIGS. 26 to 29.

Figure 26:
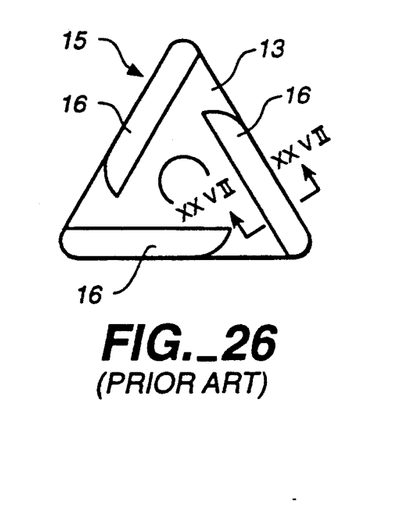
FIG. 26, is a plan view of a cutting tool assembly having a breaker.
Figure 27:
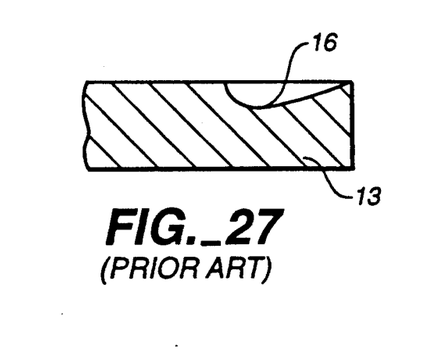
FIG. 27 is an enlarged cross section of the cutting tool assembly of FIG. 26 taken along the line XXVII—XXVII.
Figure 29:
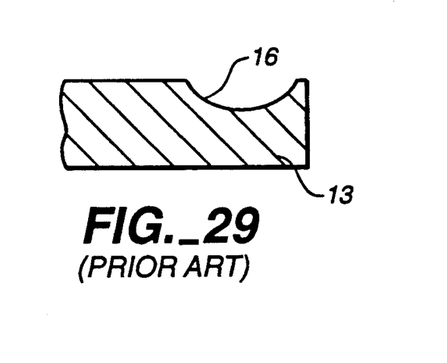
FIG. 29 is an enlarged cross section showing the cutting tool assembly of FIG. 28 taken along the line XXIX—XXIX.

As shown in FIGS. 26 and 27, a throw away tip 15 having a triangule is notched along the respective sides to form chip breakers 16. Whereas as shown in FIGS. 28 and 29, a throw away tip 15 is notched along the entire periphery to form a chip breaker 16. In a cutting tool made of a sintered hard metal, such chip breaker 16 can be formed relatively easily.

However, it is difficult to form a chip breaker for chip disposal on the composite sintered body due to its high hardness. Soldering a chip breaker onto the cutter assembly is also difficult due to its thinness (e.g. usually not more than 1 mm).

Figure 25:
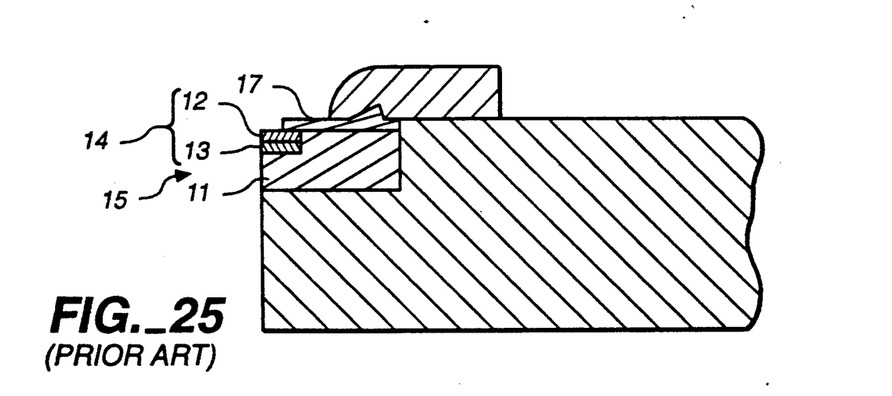
FIG. 25, is a cross section showing a cutting part body with its base having a breaker piece is disposed thereon.

Another prior art cutting tool assembly has a disposable cutting tip assembly as shown in FIG. 25. A chip breaker piece 17 is merely held on the disposable tip assembly 15 by the downward force from a support 18. Therefore, this cutting tool assembly suffers the drawback that the breaker piece 17 can slip or even be lost when the tip assembly 15 is replaced.

SUMMARY OF THE INVENTION

An object of this invention is to provide a low production cost cutting tool assembly having a composite hard sintered body as the cutting part in which the bond strength between the cutting part and the base is improved.

Another object of this invention is to provide a cutting tool assembly having a chip breaker which can be provided adjacent to the cutting edge to facilitate disposal of chips with improved bond strength between the composite hard sintered body and the base, so that chipping o slippage of the cutting part can be prevented.

In order to achieve the above objects, a cutting tool assembly is provided which includes a base having a recess formed therein. The recess includes three inner surfaces, each surface having enough area to receive a stress in a different directions from a work during the cutting operation. A cutter assembly includes a cutting tip and a support that are joined by sintering. The support has three support faces and is formed from one from the group including cemented carbide and cermet. The cutter assembly is soldered to the base such that each of the support faces is secured to an associated recess surface.

BRIEF DESCRIPTION OF THE DRAWINGS

The features of the present invention that are believed to be novel are set forth with particularity in the appended claims. The invention, together objects and advantages thereof, may best be understood by reference to the following description of the presently preferred embodiments together with the accompanying drawings in which:

FIGS. 1 to 5 show a first embodiment of this invention; wherein

FIGS. 6 to 8 are perspective views of various modifications of the first embodiment of a cutting tool assembly in accordance with the present invention.

FIGS. 9 to 13 show a second embodiment of this invention; wherein FIG. 9 is a perspective view of a composite cutting tool assembly.

FIGS. 15 to 18 show a third embodiment of this invention; wherein

FIGS. 22 to 29 show prior art cutting tools.

DETAILED DESCRIPTION OF THE PREFERRED EMBODIMENTS

FIRST EMBODIMENT

Figures 1, 2:
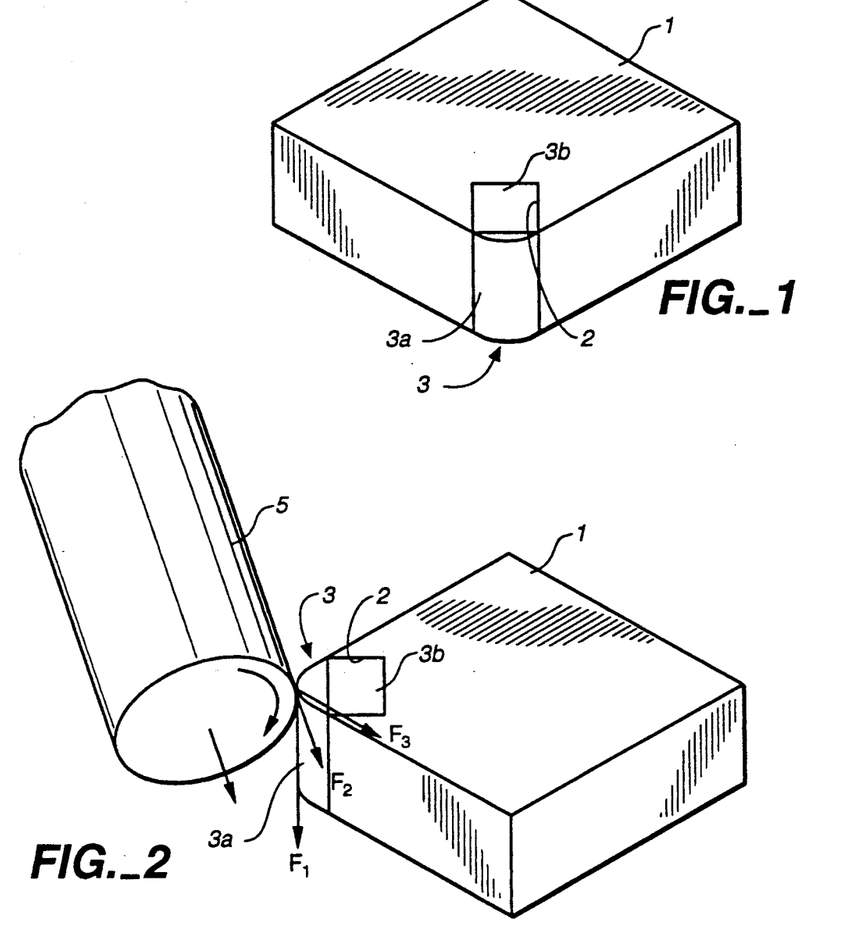
FIG. 1, is a perspective view of a cutting tool assembly.
FIG. 2, is a diagrammatic perspective view showing the cutting of a work with the cutting tool assembly shown in FIG. 1.
Figure 4:
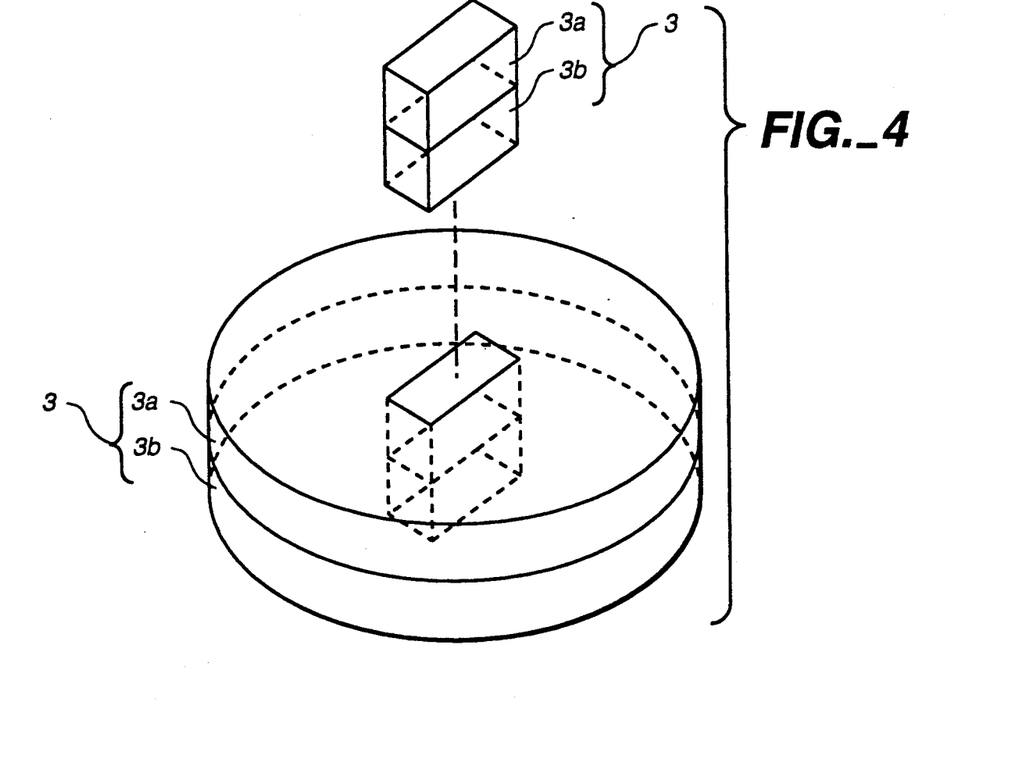
FIG. 4, in perspective view showing a cut out portion of a composite sintered body.
Figure 5:
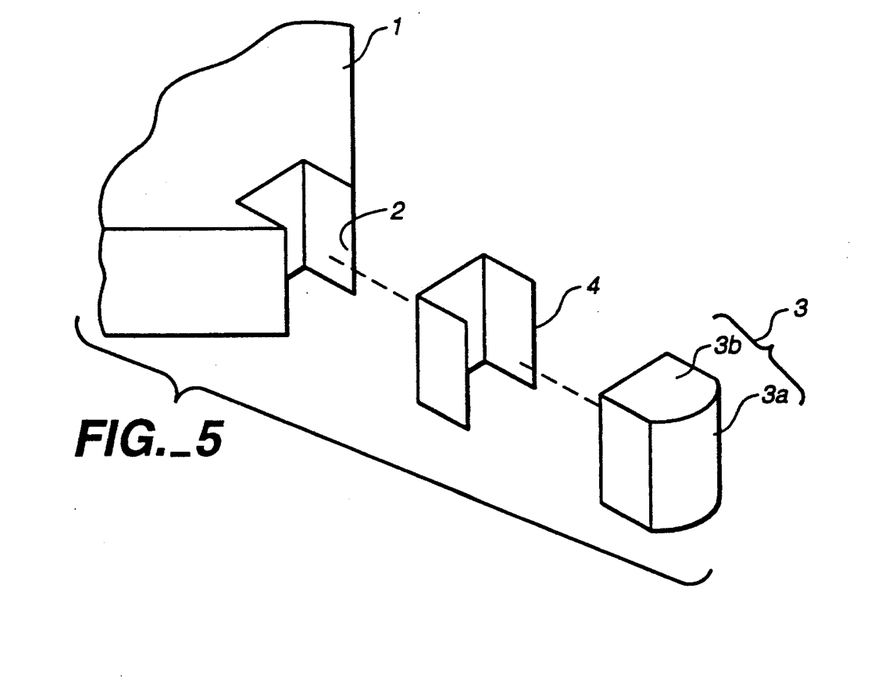

A first embodiment of this invention will be described referring to FIGS. 1 to 5. As shown in FIGS. 1 and 5, a rectangular base I made of a cemented carbide has a recess 2 at one edge that extends the entire thickness. A mixed sintered material formed from, for example, a carbide such as tungsten carbide and a metal such as nickel and cobalt can be used as the base. Instead of using a cemented carbide, a hard alloy such as a cermet primarily comprising titanium carbide and titanium nitride or steel can be used. The base material should have excellent wettability to solders.

A cutting part 3 is formed from a composite hard sintered body and includes a rectangular column-like support 3b and a cutting edge 8a. The support 8b has substantially the same shape as the recess 2. The cutting part 3 is secured into the recess 2 by a silver solder 4 which extends along the entire thickness of the base i adjacent the support 3b. It is noted that the connection between the support 3b and the recess 2 does not have to extend along the entire thickness of the base 1. In one embodiment, the support 3b may be formed from an alloy of tungsten carbide and cobalt. The cutting edge 8a is formed from a material based on cubic type boron nitride (CBN). Alternatively, the cutting edge 8a may be formed from a sintered body based on wurtzite type boron nitride or diamond or on a mixture thereof.

Now, the process of producing the cutting part 8 and mounting it on the base will be described. First, a disc-shaped support material 8b and a disc-shaped cutting edge material 3a having the same diameter are laminated and sintered as shown in FIG. 4. In carrying out the sintering, a binder comprising a mixture of a titanium compound (such as titanium carbide (TiC), titanium nitride (TiN) or a mixture thereof) and aluminum at the ratio of Ti:Al=1:8 (weight ratio) is used With such a binder, the cutting edge material 3a and the support material 8b can firmly be bonded by sintering to form a blank out of which cutting part 8 may be cut.

Next, a portion (center portion shown in FIG. 4) of the blank is cut out, and the cutting edge 8a is cut, as necessary, and formed into a predetermined shape. Subsequently, as shown in FIG. 5, the cutting part 3 is fitted into the recess 2 of the base I together with a silver solder 4 containing a flux in a manner such that the support 3b side may face the recess 2.

The assembly is then introduced into an oven equipped with a high-frequency induction heater and heated at a predetermined temperature, usually about 600° to 800° C. At such temperatures, sufficient bond strength can be formed between the base and the support 3b, since both have excellent wettability to the silver solder 4. The heating temperature for soldering should be at a level where neither cracking occurs in the assembly due to the difference in the thermal coefficient of expansion between the high pressure phase boron nitride or diamond and the hard sintered body nor adverse conversion of the high pressure phase boron nitride or diamond into a low pressure phase. After cooling, the desired cutting tool assembly is obtained.

Now, the use of the cutting tool assembly will be described. As shown in FIG. 2, the base 1 is held in the desired position by a generally known holding member (not shown). A cylindrical columnar work 5 is rotatably supported, so that it can be shifted axially, at a position adjacent to the cutting tool assembly.

Figure 3:
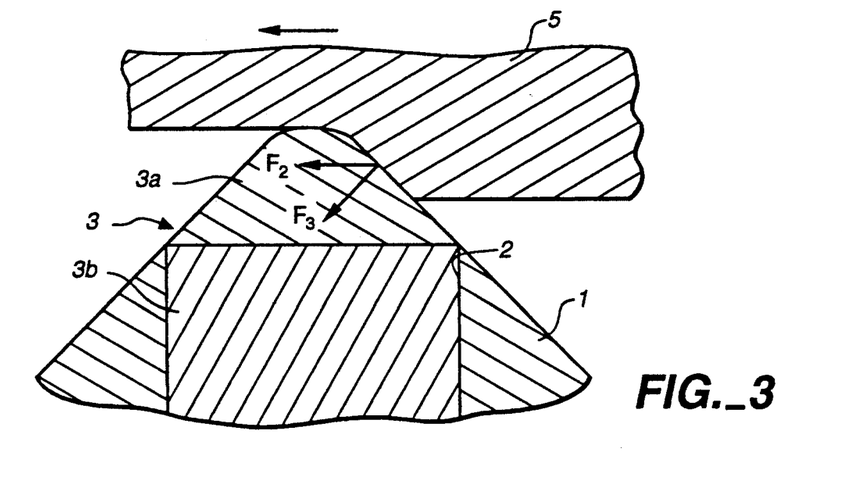
FIG. 3, is an enlarged cross section showing a state where a work is cut using the cutting tool assembly shown in FIG. 1.

The cutting edge 3a of the cutting tool is pressed against the circumference of the work 5, as shown in FIG. 3. In this state the work 5 is shifted axially as it is rotated, whereby the work 5 is successively cut from one end to the other. In this process, the cutting edge 3a is subject to the downward force (cutting force: $F_1$) as shown in FIG. 2 based on the rotation of the work 5. On the other hand, the cutting edge 3a is also subject to the force in the same direction as the axial movement of the work 5 (feed force: $F_2$), and further to a force (thrust force: $F_3$ from the cut face of the work 5 in the direction orthogonal to said face.

The cutting tool assembly according to this embodiment is bonded between the recess 2 and the support 3b along three independent faces of the support 3b to provide a large bonding area. (i.e. both side surfaces and the rear surface). Accordingly, a strong bonding force is obtained between the support 3b and the base 1. This provides high resistance against the cutting force $F_1$. Moreover, since the cutting part 8 is mounted into the recess 2 and the cutting edge 3a and the support 3b are sintered together, the bond strength achieved between the base I and the cutting part 8 is highly resistant not only to the feed force $F_2$ but also to the thrust force $F_3$. Thus, neither slippage nor chipping of the cutting part 3 occurs.

In the cutting tool assembly formed in accordance with this embodiment, high bond strength is achieved between the base 1 and support 3b of the cutting part 3, so that the cutting tool assembly can be used repeatedly in a stable state with excellent durability.

Further, the size of the cutting part 3 necessary to maintain a predetermined level of bond strength between the support 3b and the recess 2 can be minimized, and thus the production cost can be reduced.

This invention is not limited to the first embodiment and the following constitutions are also possible.

Figure 6:
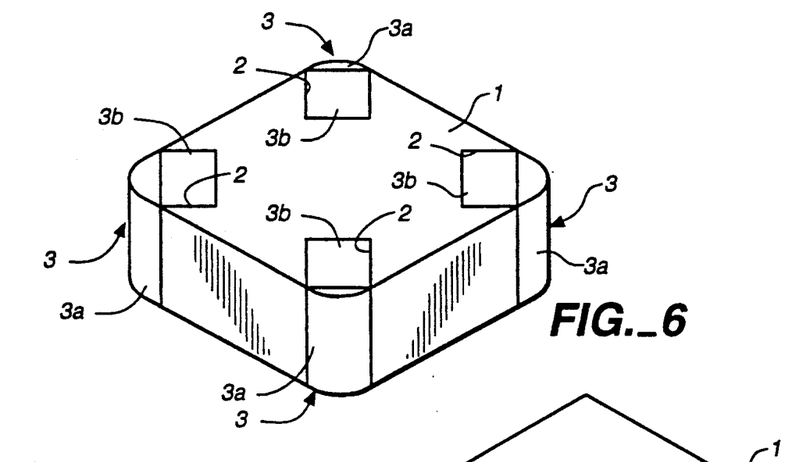
FIG. 6, is an exploded perspective view showing how the cut out composite sintered body is fit into the recess of the base.

(1) As shown in FIG. 6, a plurality of recesses 2 may be formed in the base 1, with a recess being provided in each corner. Each recess receives a cutting parts 3 as previously described. In this modification all four edges of a square base 1 may be utilized as cutting tips. Further, each cutting part has upper and lower cutting edges. Therefore, a total of eight cutting edges are provided on a common base. This reduces the amount pro rata base size required per cutting edge, which tends to reduce the production cost. It is noted that other geometries could be used as well.

(2) The horizontal cross section of the recess 2 of the base 1 may be any of triangular, trapezoidal and sectorial as well as rectangular as in the first embodiment. Further, as shown in FIG. 7, when a greater cutting force $F_1$ is applied to the cutting edge 3a, the recess is preferably tapered to have reduced horizontal cross section toward the bottom, since the cutting force $F_1$ is applied toward the thickness of the base 1.

Figures 7, 8, 9:
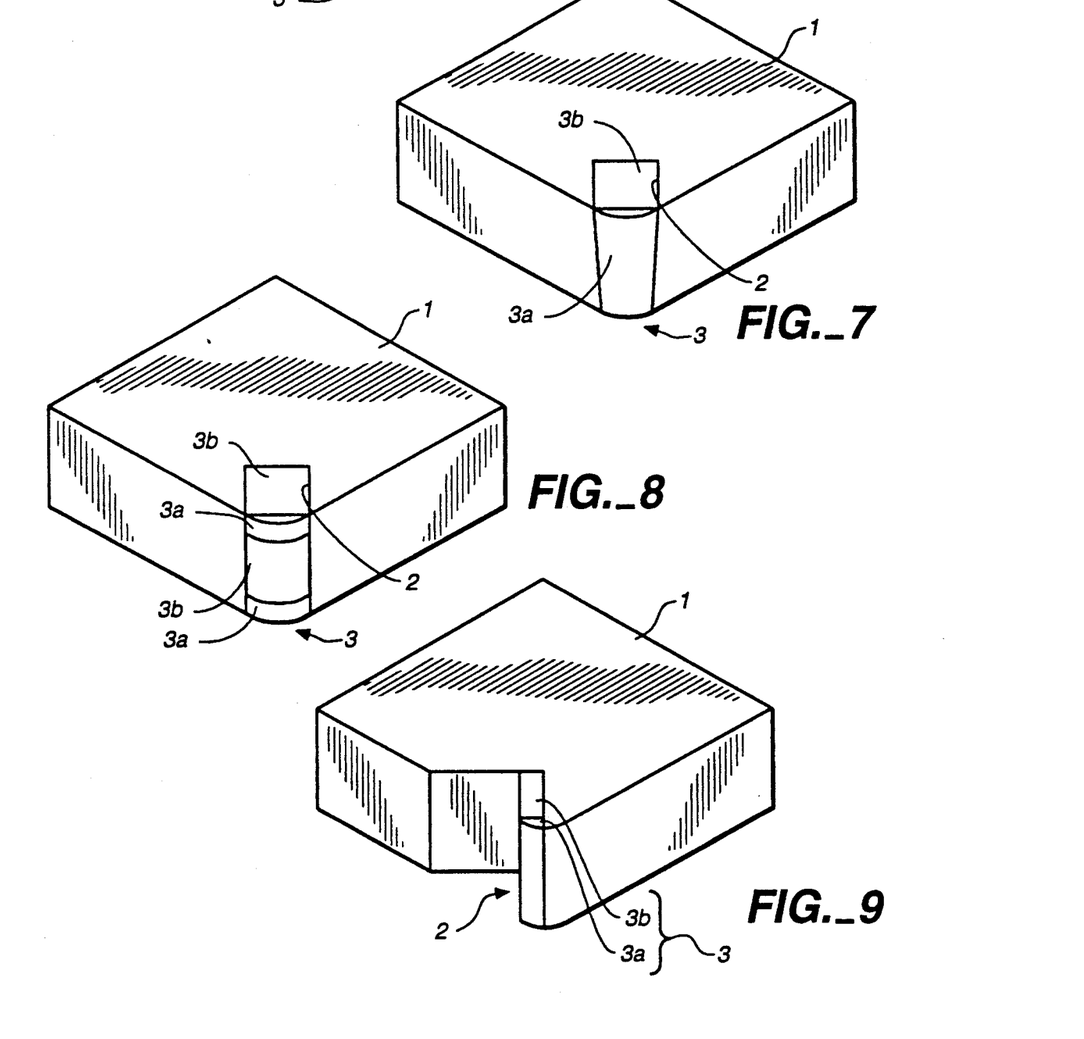

(3) As shown in FIG. 8, the support 3b and the cutting edges 3a may be alternatively laminated into three or more layers along the thickness of the base to form the cutting part 3. This constitution reduces the amount of the cutting edge material 3a, which further reduces the production cost.

SECOND EMBODIMENT

Figure 10:
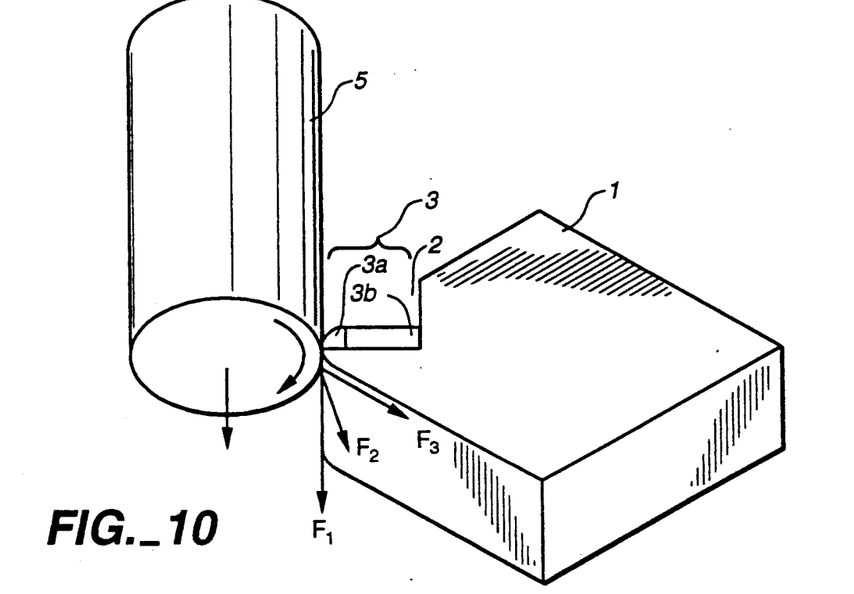
FIG. 10 is a perspective view showing the cutting tool assembly of FIG. 9 in use
Figure 11:
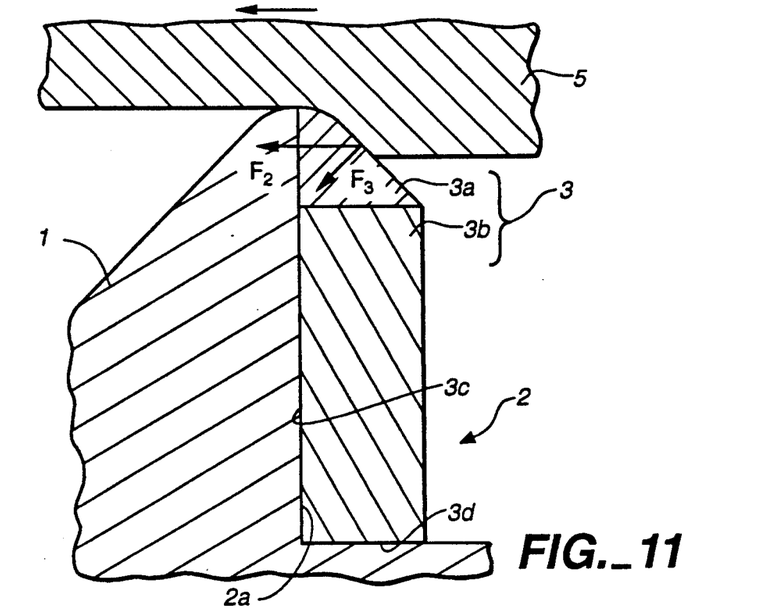
FIG. 11 is a partially enlarged cross sectional view of the cutting tool assembly cutting a work.

A second embodiment of this invention will be described referring to FIGS. 9 to 13. A base 1 similar to that described in the first embodiment is used. A recess 2 having a right-triangular horizontal cross section is formed at one edge of the base 1 such that it extends the entire thickness of the base. On the internal wall surface of the recess 2, a cutting part 3 comprising a rectangular column-like support 3b and a cutting edge 3a formed on one face thereof is secured. As shown in FIG. 11, the side face 3c and the end face 3d of the support 3b are soldered onto the internal wall surfaces of the recess 2 with a silver solder 4. Of the two internal wall surfaces of the recess 2 on which the cutting edge 3a and the support 3b are bonded, one internal wall surface 2a is subject to the pressure from the work 5 during cutting.

The cutting part 3 does not need to extend along the entire thickness of the base 1. The same materials used for the support 3b and the cutting edge 3a in the first embodiment can be used in this embodiment as well.

Figure 12:
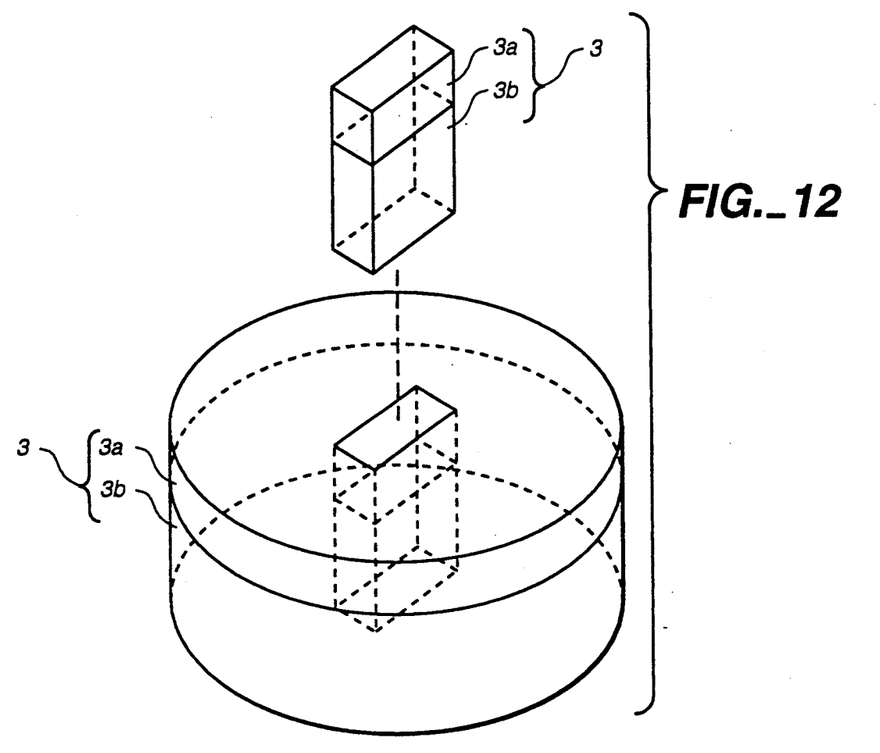
FIG. 12 is a perspective view showing a cut out portion of the composite sintered body.
Figure 13:
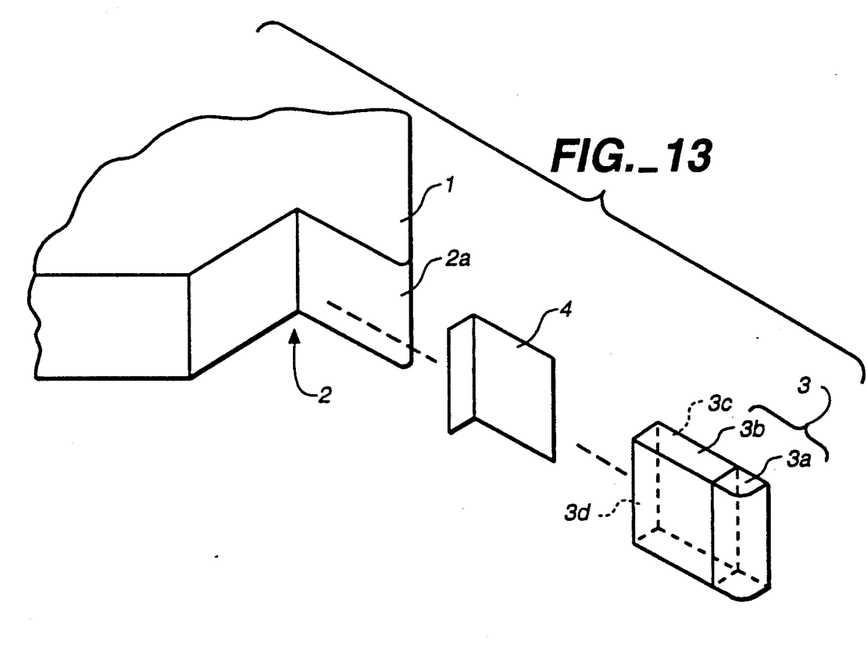
FIG. 13 is an exploded perspective view showing how the cut out composite sintered body is fitted into the recess of the base.

A process for producing the cutting part 8 and the way of fitting it will be described First, a disc-shaped support material 3b and a disc-shaped cutting edge material 3a having the same outer diameter but different thickness are sintered together as shown in FIG. 12. In carrying out the sintering, the same binder as used in the first embodiment is used, and thus the cutting edge material 3a and the support material 3b can firmly be bonded by the sintering to form a blank of cutting part 3. Next, a portion of the thus obtained blank 3 is cut out, and the cutting edge 3a is cut into a predetermined shape. Subsequently, as shown in FIG. 13, the cutting part is mounted in the recess 2 of the base 1 together with silver solder 4 containing a flux in such a way that the side face 3c of the support may face the internal surface 2a of the recess.

The assembly is then introduced into an oven equipped with a high-frequency induction heater (not shown) and heated in the same manner as in the first embodiment, followed by cooling to obtain the desired cutting tool assembly. As is apparent from FIGS. 2 and 10, this cutting tool assembly can be used in the same manner as in the first embodiment.

The work 5 is shifted gradually forward in the direction of the arrow (in FIGS. 10 & 11) as it is rotated. Thus, the work 5 gradually cuts from one end toward the other since the cutting edge 3a presses against the circumference of the work 5. As shown in FIGS. 10 and 11, the cutting edge 3a is subject to the cutting force $F_1$, feed force $F_2$ and thrust force $F_3$ during cutting.

In this embodiment, the bond between the recess 2 of the base 1 and the support 3b of the cutting part 3 is formed on two faces, that is the side face 3c and the end face 3d of the support 3b. This provides a large bonding area. Accordingly, a good bond strength is obtained between them. This allows the cutting tool assembly to withstand the cutting force $F_1$. Further, since the cutting part 3 is also secured to the internal surface 2a of the recess 2 on which pressure from the work 5 is applied during cutting, the cutting tool assembly is fully resistant to the feed force $F_2$ and thrust force $F_3$.

As described above, the cutting tool assembly of this embodiment also has excellent durability without suffering the problem of slippage or chipping of the cutting part 3 like the cutting tool assembly of the first embodiment. Additionally, the size of the cutting part 3 can also be minimized, which reduces the production costs.

Figure 14:
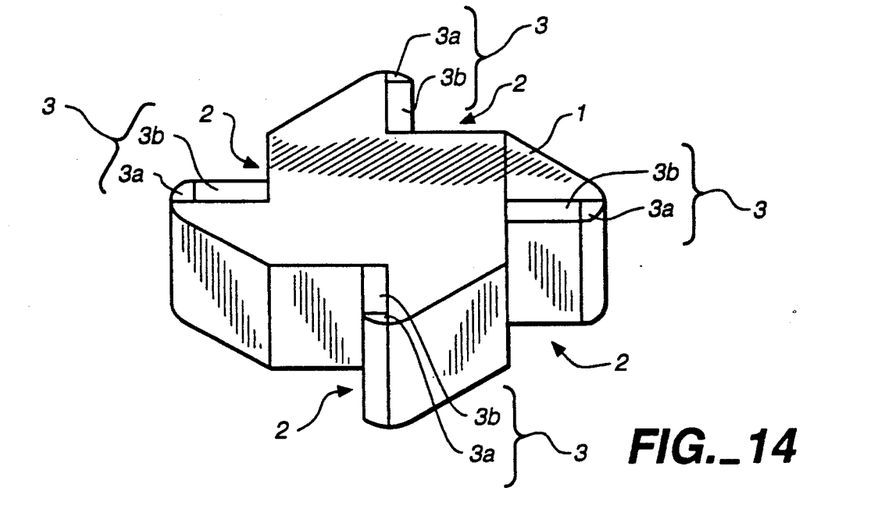
FIG. 14 shows a perspective view of a variation of the second embodiment of the composite cutting tool assembly according to this invention.

The second embodiment may also be modified within the scope of the invention as suggested in the following modifications. As shown in FIG. 14, the recess 2 can be formed on the base 1 at each corner as discussed above with respect to the first embodiment. Similarly, two cutting edges may be formed on each cutting part.

THIRD EMBODIMENT

Figure 15:
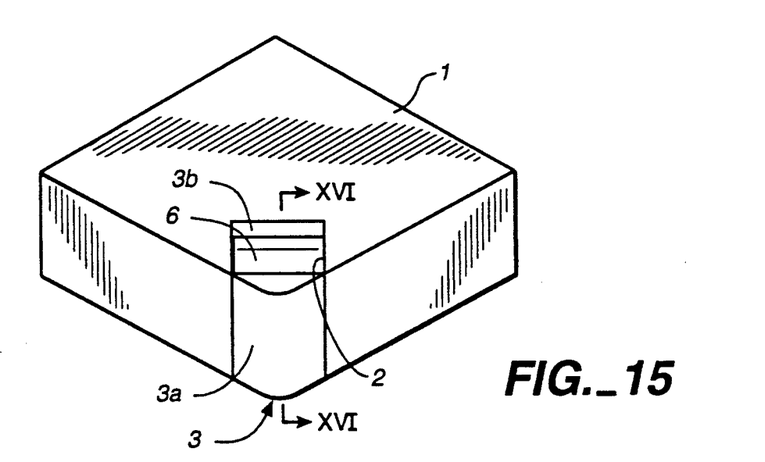
FIG. 15, is a perspective view showing a cutting tool assembly having a breaker.
Figure 16:
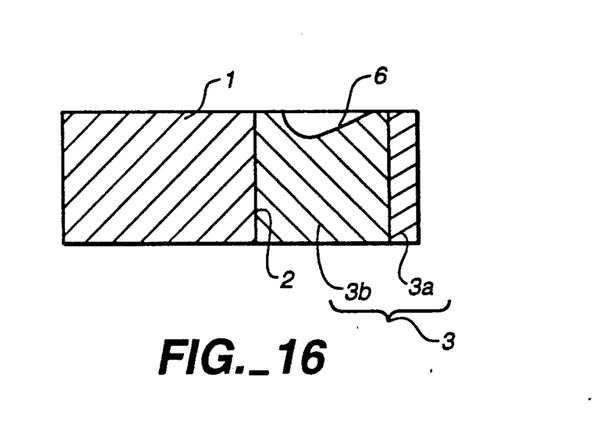
FIG. 16 is a cross section of the cutting tool assembly shown in FIG. 15 taken along the line XVI—XVI.
Figure 17:
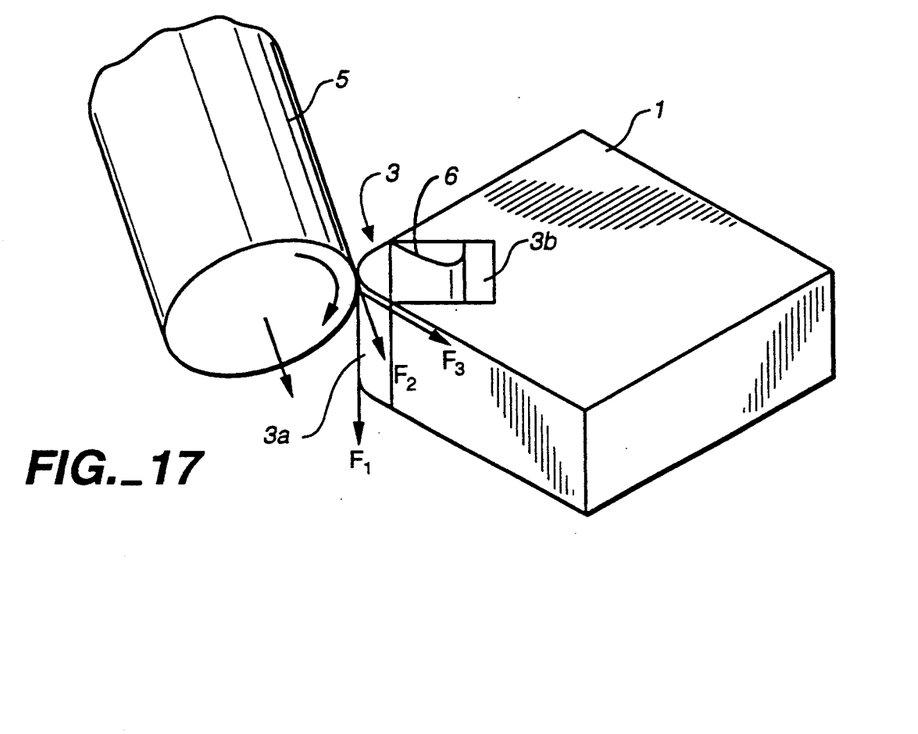
FIG. 17, is a perspective view showing how the cutting tool assembly having a breaker is used.

A third embodiment of this invention will be described referring to FIGS. 15 to 18. FIG. 15 shows a perspective view of the cutting tool assembly having a chip breaker according to the third embodiment. FIG. 16 is a cross section taken along the line XVI—XVI of FIG. 15.

As shown in FIGS. 15 and 16, the base 1 has a recess 2 as formed in the first embodiment. The base may be formed from a sintered material as in the first embodiment.

A cutting part 3 made of the same material as in the first embodiment is fitted in the recess 2 and secured therein with a silver solder 4. A chip breaker 6 is formed on the upper surface of the support 3b of the cutting part 3. The chip breaker 6 is formed as a tapered groove that grows deeper toward the base 1. The chip breaker 6 can be formed by machining the upper surface of the support 3b with a diamond whetstone. The shape, dimensions, position, etc. of the chip breaker 6 are decided depending on the kind of the work material and cutting conditions. In the embodiment shown in FIG. 15, the chip breaker 6 is formed on the upper surface of the support 3b. It should be appreciated that chip breakers can be formed on the lower surface thereof or on the both surfaces as well.

Fitting and securing of the cutting part 3 into the recess 2 of the base 1 can be carried out in the same manner as in the first embodiment.

When the cutting tool assembly of this embodiment is used in the same manner as in the foregoing embodiments, the chip from the work 5 flows out continuously along the cutting face and broken into pieces when impinged upon the chip breaker 6.

Figure 18:
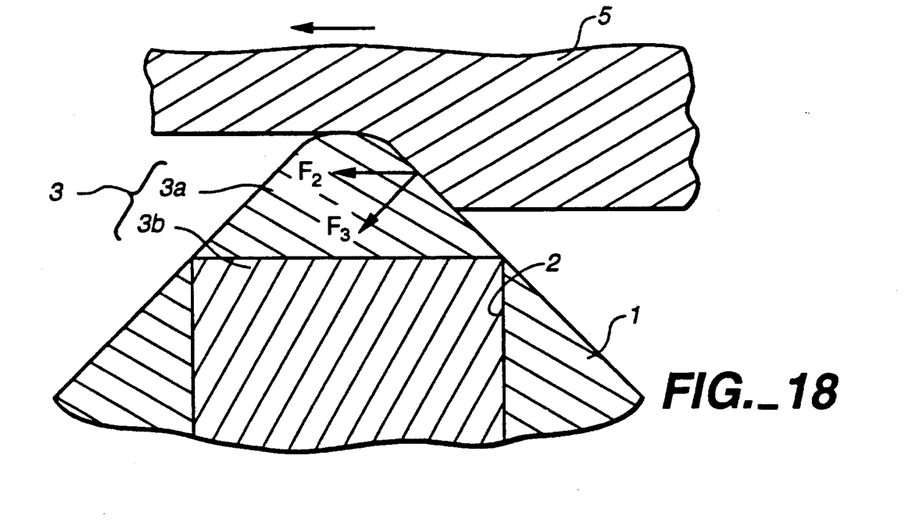
FIG. 18 is a partially enlarged cross section showing the cutting of a work with the cutting tool assembly having a breaker.
Figure 19:
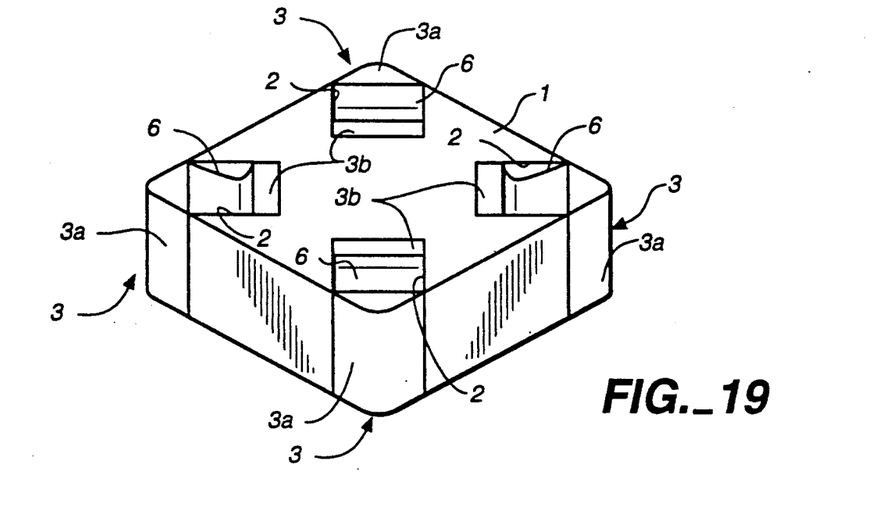
FIGS. 19 and 20 show, in perspective view, variations of the third embodiment of the cutting tool assembly according to this invention.

In this cutting process, the cutting edge 3a is subject to the cutting force $F_1$ based on the rotation of the work 5. The cutting edge 3a is also subject to the feed force $F_2$ and the thrust force $F_3$ based on the axial feeding of the work 5 as shown in FIG. 18.

In this embodiment, a wide bond area is secured between the recess 2 of the base 1 and the support 3b of the cutting part 3 like in the first embodiment. This provides a large bond strength therebetween. Therefore the cutting tool assembly is resistant to any of the cutting force $F_1$, feed force $F_2$ and thrust force $F_3$. Further, since the chip discharged continuously from the work 5 is broken when impinged upon the chip breaker as it reaches the cutting face, the broken chips can smoothly be discharged.

Figure 20:
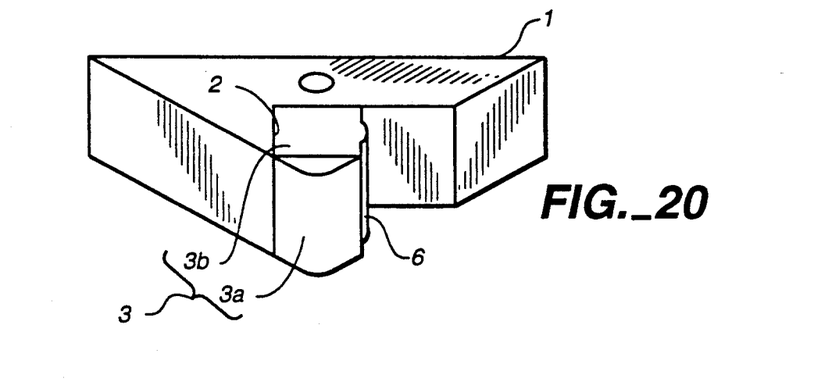
Figure 21:
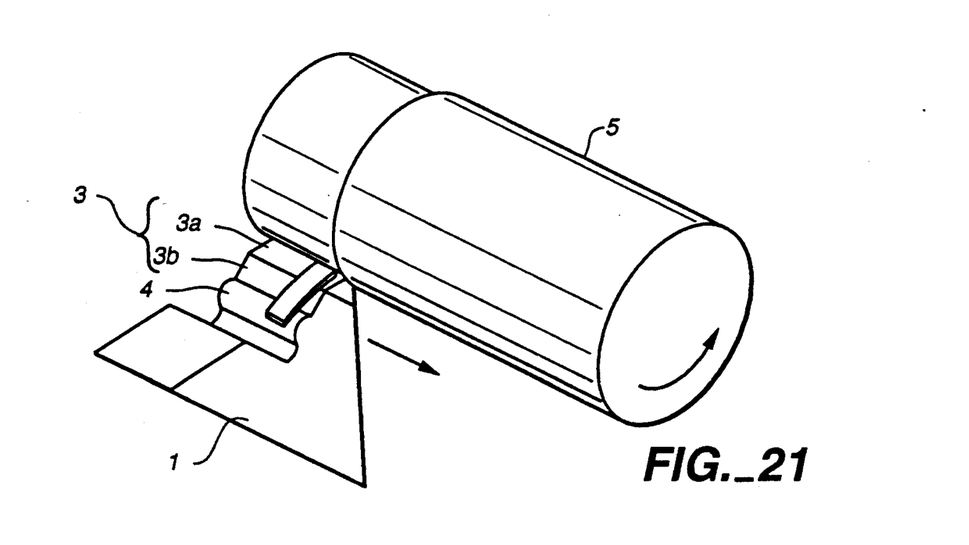
FIG. 21 is a perspective view showing the cutting of a work piece using the cutting tool assembly shown in FIG. 20.

This invention is not limited to the third embodiment and, for example, the following modifications are possible. As shown in FIG. 20, a recess 2 can be formed at one edge of the base 1 having a triangular plane, and the support 3b of a cutting part 3 is secured on one internal wall surface of the recess 2, wherein a ridge-like chip breaker 6 may be formed on the outer side of the support 3b on the opposite side of the bonded face. As shown in FIG. 21, when the work is cut by moving the cutting tool assembly with the cutting edge 3a and the support 3b being abutted against the work 5, chips can effectively be discharged.

Although only a few embodiments of the present invention have been described herein, it should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope of the appended claims.

What is claimed is:

1. A cutting tool for cutting a workpiece, the cutting tool comprising:

a base having a thickness and a corner, a recess being formed at the corner in the base so as to extend the entire thickness of the base, the recess having a first inner surface and a second inner surface which are substantially perpendicular to each other; and a cutter assembly including a cutting tip and a support extending the entire thickness of the base such that the cutting tip has a pair of cutting edges on opposite sides thereof; and wherein the tip is substantially triangular in shape, having a first contact surface and a second contact surface which are substantially perpendicular to each other, the support is substantially rectangular in shape with first and second mutually opposite side surfaces and first and second mutually opposite end surfaces which are substantially perpendicular to and smaller in area than the first and second side surfaces, each of the side surfaces of the support is smaller in area than the second inner surface of the recess, the first contact surface of the tip is attached to the first end surface of the support, the second end surface of the support is attached to the first inner surface of the recess, and the second contact surface of the tip and the second side surface of the support are attached to the second inner surface of the recess such that a distal portion of the first inner surface of the base is exposed.

2. A cutting tool as recited in claim 1 wherein the base has four corners each having a recess formed therein and wherein a plurality of cutting assemblies are provided, each said cutting assembly being mounted in an associated recess.

3. A cutting tool as recited in claim 1 wherein the recess is tapered such that the width of the recess is gradually widened away from the cutting tip.

4. A cutting tool as recited in claim 1 wherein a pair of cutting tips are provided and a second support is positioned between the cutting tips, both cutting tips and the second support being sintered to the first support.

5. A cutting tool as recited in claim 1 wherein a rake face is provided on the support and a chip breaker is provided on the rake face.

6. A cutting tool as recited in claim 5 wherein the chip breaker has an inclined groove which becomes deeper towards the base.

7. A cutting tool as recited in claim 1 wherein a plurality of recesses are formed in the base, and a plurality of said cutting assemblies are provided, each said cutting assembly being placed in one of said recesses.

* * * * *